US005411811A

United States Patent [19]

Piacente et al.

[11] Patent Number: 5,411,811

[45] Date of Patent: May 2, 1995

[54] INLAID VINYL SHEETING PROCESS AND PRODUCT

[75] Inventors: Anthony N. Piacente, Lawrenceville; George J. Papp, Browns Mills; Richard E. Whitehouse, Yardville; Robert D. Mansolillo, Bloomfield, all of N.J.

[73] Assignee: Congoleum Corporation, Lawrenceville, N.J.

[21] Appl. No.: 972,583

[22] Filed: Nov. 6, 1992

Related U.S. Application Data

[63] Continuation of Ser. No. 502,109, Mar. 29, 1990, Pat. No. 5,178,912.

[51] Int. Cl.[6] .......... A47G 35/00; B32B 3/00

[52] U.S. Cl. .......... 428/542.2; 428/143; 428/172; 428/204; 428/207; 428/908.8

[58] Field of Search .......... 428/156, 172, 143, 147, 428/207, 204, 542.2, 212, 323, 327, 402, 908.8, 409, 913.3; 5/417; 52/127

[56] References Cited

U.S. PATENT DOCUMENTS

| | | | |
|---|---|---|---|
| 1,567,091 | 12/1925 | Tone | 404/21 |
| 3,267,187 | 8/1966 | Slosberg et al. | 264/122 |
| 3,293,094 | 12/1966 | Nairn et al. | 156/79 |
| 3,325,574 | 6/1967 | Stadden | 264/73 |
| 3,350,483 | 10/1967 | Erb et al. | 264/74 |
| 3,493,418 | 2/1970 | Amano | 117/72 |
| 3,511,696 | 5/1970 | Murray | 427/428 |
| 3,527,146 | 9/1970 | Garling | 94/7 |
| 3,562,076 | 2/1971 | Lea | 161/5 |
| 3,676,208 | 7/1972 | Griffin | 117/161 |
| 3,682,741 | 8/1972 | Elliott et al. | 156/298 |
| 3,754,065 | 8/1973 | Hofmann et al. | 264/70 |
| 4,059,709 | 11/1977 | Conger et al. | 427/264 |
| 4,196,243 | 4/1980 | Sachs et al. | 428/147 |
| 4,212,691 | 7/1980 | Potosky et al. | 156/79 |
| 4,278,483 | 7/1981 | Mansolillo | 156/79 |
| 4,409,280 | 10/1983 | Wiley et al. | 428/203 |
| 4,440,826 | 4/1984 | Witman | 428/327 |
| 4,530,856 | 7/1985 | Kauffman et al. | 427/197 |
| 4,794,020 | 12/1988 | Lussi et al. | 427/195 |
| 4,844,849 | 7/1989 | Miller et al. | 264/46.4 |
| 4,916,007 | 4/1970 | Manning et al. | 428/203 |
| 5,015,516 | 5/1991 | Lussi et al. | 428/143 |
| 5,059,471 | 11/1991 | McNally et al. | 428/172 |
| 5,178,912 | 1/1993 | Piacente et al. | 427/278 |
| 5,223,322 | 6/1993 | Colyer et al. | 428/141 |

FOREIGN PATENT DOCUMENTS

| | | |
|---|---|---|
| 320752 | 2/1970 | Sweden . |

*Primary Examiner*—Donald J. Loney
*Attorney, Agent, or Firm*—Synnestvedt & Lechner

[57] ABSTRACT

A monolithic particle-containing layer in multi-layered sheeting (for example, sheeting of the type comprising resilient vinyl flooring) is produced by applying a composition comprising a liquid material having dispersed therein decorative particles (for example, a vinyl plastisol containing dispersed vinyl dryblend particles) to a surface of a layer of the multi-layered sheeting, the application of the composition being preferably by the reverse roll coating method.

9 Claims, 1 Drawing Sheet

INLAID VINYL SHEETING PROCESS AND PRODUCT

This is a continuation of application Ser. No. 07/502,109 filed on Mar. 29, 1990, now U.S. Pat. No. 5,178,912.

FIELD OF THE INVENTION

This invention is in the field of vinyl sheeting, especially vinyl sheeting which has decorative particles inlaid therein and which is useful as flooring, as well as to a process for making such product, particularly a process for incorporating the decorative particles into the sheeting.

Vinyl sheeting which is decorative and wear-resistant is widely used in a variety of products, such as wall coverings, table tops, book covers, etc., as well as in floor coverings. The decoration is an important aspect of the product's appeal.

The present invention will be described initially in connection with its use in floor covering applications. However, the invention can be used also in other applications, as will be discussed hereinbelow.

There are a number of techniques by which vinyl floor covering can be decorated, including the use of several layers which add decorative or aesthetic effects to the product. For example, a pigmented vinyl resin can be employed, providing a uniformly colored floor product, or the vinyl sheeting can be overprinted in a pattern with one or more colored inks. In the latter case, the pattern usually must be protected with a transparent wearlayer if the pattern is to survive foot traffic. Such products do not have the three-dimensional appearance which many regard as desirable in a floor covering.

Vinyl floor covering in which the decoration does have a three-dimensional aspect is also known in the art. Such products include, for example, inlaid and embossed vinyl floor sheeting. Inlaid vinyl sheeting incorporates a stratum of particulate material which may be formed on a backing material or laid over a pigmented background so that, viewed from above, some of the pigmented layer can be seen beneath the particle-containing stratum. An inlaid product may not require a wearlayer, since foot traffic will not abrade through a relatively thick decoration.

Inlaid vinyl sheeting can include a particulate layer which is either substantially uniform across the sheet, that is, the inlaid layer is monolithic, or the inlay can be present in the form of a design or geometric pattern. These products are produced in different ways.

In the patterned type of inlaid product, the particulate material is applied according to the desired pattern or design. Generally, the particles are modified with a liquid medium and incorporated into the sheeting by one of several printing techniques. For example, U.S. Pat. No. 3,325,574 discloses the production of an inlaid sheeting in which the particulate stratum is a geometric design of differently colored particles applied to a backing material, such as felt. The composition comprising each colored particle includes plasticized vinyl resin (about 3 parts resin to 1 part plasticizer by wt.), filler, and pigment of the desired color. The particles are coated with, but not suspended in, about 0.5 to 10% of a compatible vinyl plastisol (about 1 part resin to 1 part plasticizer by wt.). Each color in the design is applied sequentially to the backing through a stencil. The resultant coated sheet is then heated under pressure to consolidate the particles and fuse the plastisol.

The inlaid floor covering described in U.S. Pat. No. 3,350,483 includes a pigmented plastisol overcoated with a decorative particulate-containing layer applied through a stencil discontinuously as splotches. The overcoat comprises decorative resin particles, including, for example, pigmented resin particles, in a vinyl plastisol. The particle-containing stratum is partially fused before pressing and flattening the splotches.

U.S. Pat. No. 4,278,483 describes an inlaid product in which granules of poly(vinyl chloride) are applied to a backing and are then partially fused to form a porous layer which is printed with decorative compositions by the silkscreen method. The decorative compositions comprise pigmented poly(vinyl chloride) particles in a vinyl plastisol.

Although the patterned type of inlaid product is the choice for many applications, there is also a demand in the industry for a monolithic type of inlaid product. It is to the monolithic type of inlaid vinyl sheeting and to a process for making it that this invention is directed.

REPORTED DEVELOPMENTS

In the monolithic type of inlaid product, granular or other type particles (often referred to herein as "decorative particles") are applied to the surface in a way such that they are distributed in a substantially uniform fashion over the entirety of the surface, that is, the layer of particles is monolithic. For example, U.S. Pat. No. 4,212,691 discloses the deposition of a layer of decorative particles onto a moving and vibrating web coated with a tacky, ungelled vinyl plastisol. This is followed by compressing the particles and the ungelled plastisol into a single layer by the use of pressure and thereafter gelling the plastisol at elevated temperature And finally the gelled plastisol having the particles embedded therein is fused to permanently fix the particles. A similar technique, employing somewhat different pressure/-fusion apparatus, is disclosed in U.S. Pat. No. 4,794,020. And according to U.S. Pat. No. 4,440,826, the particles can be applied to an underlying surface of thermoplastic resin and then forced into the layer of thermoplastic resin by the use of pressure and heat.

The heretofore known methods by which a monolithic, decorative particulate layer is incorporated as an inlaid stratum into vinyl sheeting are cumbersome and inefficient, generally involving application of the particles by sprinkling them onto a resinous surface to which they adhere and/or in which they can be embedded by use of pressure and heat, and then fusing the particles and resins to permanently fix them in the sheeting. Sprinkling the particles leads to uneven distribution on the receiving surface because the particles tend to stick together. Agglomerates of the particles tend to form and clog equipment. Also, the particulate layer generally is not smooth enough to permit rotogravure printing thereon, the preferred printing method if the product calls for overprinting.

Furthermore, the problems associated with the traditional methods of applying the particles by the sprinkling method are exacerbated when the width of the receiving surface is increased beyond traditionally used sheeting widths (generally not in excess of six feet). There is presently a need in the industry for monolithic type inlaid sheeting having widths ranging up to 12 feet or more. The capital investment in conventional type equipment which would be capable of producing sheeting in such widths is prohibitive. And, as mentioned above, it is expected that the problems associated with present day equipment would be encountered in worsened fashion in producing sheeting of such widths.

Thus, it is one object of this invention to provide a less cumbersome, less costly, more efficient, and more precise method for incorporating an inlaid particulate layer into vinyl sheeting, including sheeting which has a width of up to about 12 feet or more. It is another object to provide a more uniform inlaid layer. It is yet another object to provide a technique which is capable of being carried out on readily available equipment.

SUMMARY OF THE INVENTION

In accordance with the present invention, there is provided an improved continuous process for making multi-layered sheeting of indefinite length and having a predetermined width and including a monolithic layer which contains decorative particles and which is substantially coextensive with the width of said sheeting, the improvement comprising: forming said monolithic layer by continuously applying to the surface of a layer of said multi-layered sheeting in a zone extending across substantially the entire width of the surface a composition comprising a liquid material having dispersed therein said decorative particles, said composition being applied as the sheeting is continuously moved transversely of said zone and under conditions such that the thickness of the monolithic layer formed from said composition is substantially uniform and the decorative particles are substantially uniformly dispersed therein; and permanently adhering said monolithic layer of particles to the surface of said layer, thereby providing sheeting comprising a monolithic layer having a substantially uniform thickness and decorative particles substantially uniformly dispersed therein.

In preferred form, the composition which is used to form the monolithic layer of decorative particles is a vinyl plastisol having dispersed therein solid particles of a pigmented vinyl dryblend, as described hereinbelow. Also in preferred form, means used to apply the composition comprising the liquid carrier material having dispersed therein said decorative particles is a reverse roll coater, which is a known type of apparatus, as described hereinbelow.

Another aspect of the present invention provides improved multi-layered sheeting having a predetermined width and including a monolithic layer which is substantially coextensive with the width of said sheeting and which contains decorative particles, and wherein the particles used to form said monolithic layer have a predetermined shape, but are capable of being deformed out-of-shape under the influence of pressure, the improvement comprising the monolithic layer of said sheeting being substantially uniform in thickness and having said particles substantially uniformly dispersed therein, and wherein the particles in said monolithic layer have substantially the same shape as said predetermined shape.

In preferred form, the multi-layered sheeting comprises resilient flooring in which the monolithic layer comprises a transparent matrix of vinyl chloride-based resin having dispersed therein monodimensional particles comprising a pigmented vinyl chloride-based resin, for example, granules of such resin, with the monolithic layer being the wearlayer of the flooring. In a particularly preferred form of the invention, the aforementioned wearlayer overlies and is adhered to a patterned or printed embossed layer of the multi-layered flooring which includes also a backing which underlies and is adhered to the embossed layer.

With respect to the product aspect of the present invention, it is noted that decorative particles used popularly in the fabrication of prior art sheetings are comprised typically of materials, such as thermoplastic resins, which are capable of being deformed under the influence of pressure. Deformation of such materials is readily encountered when the particles are subjected to both heat and pressure. As mentioned above, both heat and pressure are used typically in prior art processes for forming the inlaid particulate layer of the sheeting. The use of such conditions tends to deform the particles, with the result that the desired three-dimensional effect and/or other desired effects that are intended to be achieved by use of the decorative particles are lessened. Such problems can be avoided by the practice of the present invention which can be used effectively to form the inlaid particulate layer without the use of pressure. Thus, the original shapes of the decorative particles are retained in the particles comprising the layer and the desired effects, including aesthetic effects, are fully realized.

There are numerous other advantages that can be realized by practice of the present invention. Consistently high quality product can be produced by the use of equipment which, relative to conventionally used equipment, is less costly, less cumbersome, more economic to operate and maintain, and is capable of being used effectively to manufacture sheeting that is relatively wide, for example, up to 12 feet or more. Relative to industrially used prior art processes, the process of the present invention consists of fewer steps, with, for example, the separate pressure step of the prior art process being avoided.

With respect to other advantages that are afforded by practice of the present invention, and particularly as they regard quality of the product, it is possible to produce a monolithic layer which is substantially homogenous throughout its thickness, that is, the decorative particles are uniformly dispersed in the matrix material comprising the layer throughout its thickness. In addition, the present invention can be used to form a monolithic layer that is substantially uniform in thickness and which has a smooth surface that makes it suitable for printing by conventional techniques, such as rotogravure printing. Various conditions which are associated with prior art methods, such as, for example, the tracking phenomena referred to in the aforementioned '020 patent, and which adversely affect the quality of products made by such methods, are not encountered in the use of the present invention.

It is noted also that the disclosures of various of the prior art patents referred to hereinabove would seem to suggest that the decorative monolithic particulate layers formed by the processes described therein are effective wearlayers or have sufficiently smooth surfaces to be printed by the rotogravure technique. In reality, commercial products made by such methods require an additional wearlayer or an additional coating which smooths the otherwise uneven surface of the inlaid particulate layer.

DETAILED DESCRIPTION OF THE INVENTION

Figure 1:
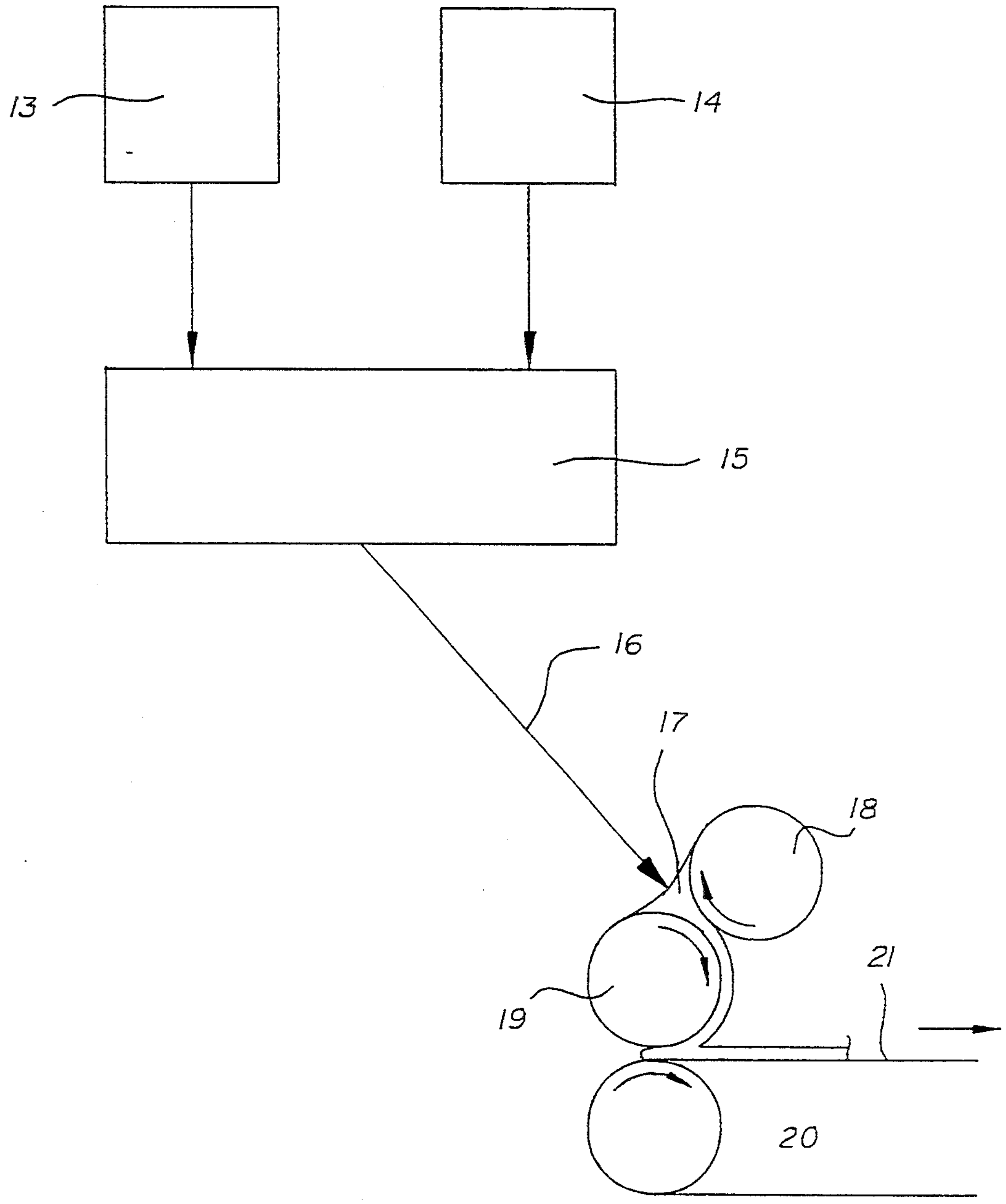
FIG. 1 is a diagrammatic representation of equipment used in the practice of the present invention.

The composition which is used to form the inlaid layer of sheeting in accordance with the present invention comprises a liquid material having dispersed therein solid particles. The liquid material functions as a carrier medium for the particles and may also function as a binder which aids in binding the particles together in the inlaid and to the surface to which they are applied.

For this purpose, the liquid material comprises preferably a vinyl plastisol, that is, fine particles of vinyl resin suspended in a liquid plasticizer. The use of plastisols in the manufacture of vinyl sheeting is, of course, well known, as exemplified in U.S. Pat. No. 4,844,849, assigned to the same assignee as the present invention. It is preferred that the resin constituent of the plastisol comprise a polymer of vinyl chloride.

The vinyl chloride polymer can either be a simple, unmixed homopolymer of vinyl chloride or a copolymer, terpolymer or the like thereof in which the essential polymeric structure of poly(vinyl chloride) is interspersed at intervals with the residues of other ethylenically unsaturated compounds polymerized therewith. The essential properties of the polymeric structure of poly(vinyl chloride) will be retained if not more than about 40 percent of the extraneous comonomer is copolymerized therein. Suitable extraneous comonomers include, for instance, vinyl bromide, vinyl fluoride, vinyl acetate, vinyl chloroacetate, vinyl butyrate, other fatty acid vinyl esters, vinyl alkyl sulfonates, trichloroethylene and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate and the like; vinylidene compounds such as vinylidene chloride, vinylidene bromide, vinylidene fluorochloride and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3-piperylene, divinyl ketone and the like.

Good results have been achieved using poly(vinyl chloride). This is the particularly preferred resin for use in the plastisol carrier.

It is recommended that the resin used in formulating the vinyl plastisol have an average particle size of about 0.02 to about 25 microns, preferably about 0.02 to about 10 microns. It should be understood that the resin constituent can include resins in larger particle sizes, for example, ranging up to 75 microns. Dispersion grade resins can be used effectively.

Although such vinyl chloride resins are preferred, it should be understood that the liquid material comprising the carrier can be formed from other thermoplastic resins dispersed in a suitable plasticizer. Examples of such resins include polystyrene, polyacrylate, polymethacrylate, polyamides, polyesters, polyethylene, polypropylene and other polyolefin homopolymers and copolymers.

When the liquid carrier material comprises a thermoplastic resin dispersed in a liquid plasticizer, it is recommended that the composition comprise about 20 to about 150 parts plasticizer per 100 parts resin, with a range of about 50 to about 80 parts plasticizer per 100 parts resin being preferred.

Although the liquid carrier material preferably comprises a plastisol, it should be understood that other liquid materials can also be used as the carrier. For example, there can be used also an organosol, that is a composition containing fine particles of resin suspended in a liquid plasticizer and including also a volatile liquid solvent. Suitable organosols would typically contain about 20 to about 55 parts of plasticizer per 100 parts of resin, with about 30 to about 40 parts of plasticizer per 100 parts of resin being particularly preferred. The amount of solvent comprising the organosol depends mainly on the desired viscosity of the carrier, as discussed hereinbelow.

The liquid plasticizer of the plastisol or organosol is selected on the basis of its compatibility with the resin constituent of the composition, that is, its ability to produce a gel, and ultimately a fully fused solid, when the composition is heated. When the resin includes vinyl chloride, suitable and exemplary plasticizers are the various phthalate esters, such as: dibutyl phthalate, dicapryl phthalate, dioctyl phthalate, dibutoxyethyl phthalate, butyl benzyl phthalate, dibenzyl phthalate, and di-(2-ethylhexyl) phthalate. Examples of other plasticizers include dioctyl adipate, didecyl adipate, dibutyl sebacate, dioctyl sebacate, dibenzyl sebacate, butyl benzyl sebacate, tricresyl phosphate, octyl diphenyl phosphate, dipropylene glycol dibenzoate and dibasic acid glycol esters.

With respect to the particles which comprise the inlaid layer of the sheeting, they can essentially comprise any material, size or shape which permits the particles to be dispersed in the liquid carrier material and which permits the liquid carrier material having the particles dispersed therein to be applied by the reverse roll coater to the receiving surface of the sheeting in the desired fashion.

The inlaid comprising the particles is in and of itself decorative or adds to the aesthetic properties of the sheeting. In addition, or alternatively, the inlaid comprising the particles may be functional, for example, in providing the sheeting with a wearlayer or with an anti-skid surface. For convenience, the particles, whether forming an inlaid which is itself decorative, and/or which adds to the aesthetic characteristics of the sheeting and/or which is functional, are referred to herein as "decorative particles."

Exemplary forms of the particles are those which are spherical in shape and those in the form of granules, flakes and chips. The particles may take the shape of many geometric forms, for example, cubes or other polydimensional forms which in cross-section are, for example, rectangular or triangular in shape. Accordingly, the particles can be monodimensional or polydimensional. They can be uniform in shape or randomly shaped. The particles can be translucent or opaque.

The size of the decorative particles can vary over a wide range, with the requirement that the particles be capable of being dispersed or suspended in the liquid carrier material dictating the maximum size of the particles. Although particles of other size can be used, it is expected that, for most applications, the particles will range in size from about 100 to about 1000 microns.

It is believed that the present invention will be used most widely in forming an inlaid ply composed of resin particles. Examples of resins which can be employed are polyolefins, such as polyethylene, and other vinyl homopolymers and copolymers such as those mentioned hereinabove. Poly(vinyl chloride) homopolymer resins are particularly preferred.

In preferred form, the poly(vinyl chloride) resin (hereafter "PVC") decorative particles comprise a dryblend of various components (hereafter "dryblend"), including plasticizer and optionally filler, stabilizer (against light and/or heat), a colorant such as a dye or pigment and any other material(s) which will impart desired properties to the dryblend.

The following is exemplary of a formulation for preparing decorative particles in the form of a dryblend.

| Component | Parts By Wt. |
|---|---|
| PVC | 100 |
| Plasticizer | 20–50 |
| Filler | 0–25 |
| Pigment | 0–25 |
| Stabilizers | 2–7 |

After compounding the dryblend mixture according to conventional techniques (see the Example section herein), it can be formed into sheets of the desired thickness by any suitable means, such as by passage through calendar rolls or by extrusion. The resulting sheets are converted by cutting into the desired geometric shapes, such as squares, triangles, circles, annuli, other polygons, etc., or irregular sizes and shapes, or mixtures of any or all of such shapes. If a multiplicity of colors and hues is desired, then a multiplicity of separate sheets are so prepared, each with its own individual colorant, dye, or pigment. Such sheets are individually cut into the desired sizes and shapes and then intermixed in the desired or required proportions in order to obtain the multicolored effects. Sheets of different thicknesses may be used. Typically, the dryblend particles are randomly shaped granules. It is preferred that the size of the particles be about 200 to about 450 microns.

Although it is preferred that the resin of the dryblend comprise PVC, it should be understood that the dryblend can be prepared from other resins.

Various factors influence the amount of decorative particles comprising the composition used to form the inlaid layer, including, for example, the size of the particles, the desired viscosity of the composition, the nature of the liquid carrier and the effect desired in the final product. In applications involving the use of plastisol, the decorative particles generally will comprise about 1 to about 25 percent by weight of the composition, preferably about 10 to about 15 percent by weight.

The viscosity of the composition should be of a value such that the composition is capable of flowing in a manner such that there is an even distribution of the composition to the receiving surface. It is believed that, for most applications, compositions having a viscosity of about 1000 to about 15,000 cps (RVT Spindel No. 4, 20 rpm for one minute, 80 to 84° F.) can be used satisfactorily. It is preferred that the composition have a viscosity of about 1500 to about 3000 cps, including compositions comprising a plastisol having dispersed therein dryblend particles of the aforementioned type.

The thickness of the monolithic layer can vary over a relatively wide range, and in the main, will be governed by the functional and/or aesthetic characteristics desired in the product. For most applications, it is believed that the thickness of the monolithic layer will be about 0.015 to about 0.075 inch, with the preferred thickness being about 0.02 to about 0.05 inch. The coating thickness will be selected to be larger than the largest dimension of the particles in the liquid suspension.

The composition comprising the liquid carrier material and the decorative particles suspended therein can be applied to any suitable surface of the multi-layered sheeting. For example, it can be applied to a backing such as a felt or other woven or non-woven backing of the type typically used in the flooring industry to form essentially a two-layered composite, with the monolithic layer of decorative particles functioning as a wearlayer which is decorative in nature.

In a different embodiment, the composition comprising the liquid carrier material and dispersed decorative particles can be applied to the surface of a foamable layer of the sheeting, for example, foamable layers of the type described in U.S. Pat. No. 3,293,094, assigned to the same assignee as the present invention. It is believed that the present invention will be used quite extensively in this type of application, a specific embodiment of which is the subject of the Example section herein.

In brief, an example of such an application involves the coating of a backing material with a vinyl plastisol having incorporated therein a blowing agent (for example, a compound which decomposes at elevated temperature to yield a gas), and an accelerator for the blowing agent (a material which lowers the temperature at which blowing agent normally decomposes). After the plastisol is applied to the backing, it is heated to a temperature at which the plastisol gels. Thereafter, the surface of the gelled plastisol can optionally, but preferably, be printed with a liquid embossing composition that imparts a design to the product. The embossing composition typically comprises a resin binder, pigment and an inhibitor for the accelerator (that is, a material which deactivates the accelerator so that when the composite is heated to an elevated temperature at a later stage of the manufacturing process to decompose the blowing agent, those surface portions of the plastisol that are printed with the embossing composition are not expanded.) After printing with the embossing composition, the resulting composite can be coated in accordance with the present invention with a composition comprising the liquid carrier material having dispersed therein the decorative particles. In preferred form, the materials comprising the composition are selected to provide a monolithic layer which has particularly good wearing characteristics. Such a composition is the subject of the Example section herein. Its use means that a separate wear layer does not have to be applied to the sheeting.

If desired, the monolithic layer of decorative particles can be coated with a material that imparts a particular type of finish to the sheeting, for example, a glossy surface of the type which can be formed, for example, from a polyurethane coating. Such finish type coatings are well known in the art.

As mentioned above, the present invention can be used to produce a monolithic layer that has a particularly smooth surface, notwithstanding the presence therein of decorative particles. This characteristic enables one to readily print the surface to good advantage by use, for example, of conventional rotogravure printing equipment. Thus, in another embodiment of the present invention, the surface of the monolithic layer can be printed.

Although other of the myriad techniques commonly employed for coating a liquid onto a surface may be employed to apply the particle-containing liquid composition, it is preferred that the composition be applied using the reverse roll coating technique. The reverse roll coater is a well-known device that has been used in the past to apply a coating composition in a continuous fashion to a moving surface. However, it is believed that a reverse roll coater has not been known for use in applying compositions of the type described herein in applications involving the production of multi-layered sheeting.

In the use of a reverse roll coater, the liquid composition is applied to the receiving surface by means of a roll which is rotated in a direction opposite to that in which the receiving surface is moved. The reverse roll coater typically employs at least two rolls, one of which is an applicator roll, that is, the roll which carries and applies the liquid composition to the receiving surface. The other roll is termed the metering roll and is positioned relative to the applicator roll in a manner such that a space is provided between the two rolls to permit the liquid composition to flow therethrough at a desired rate. The metering roll rotates in a direction opposite the direction of the applicator roll. Typically, the liquid composition is fed to the nip between the metering roll and applicator roll in a manner such that a pool of the liquid composition builds up in the nip. The applicator roll carries composition from the pool to the receiving surface. In preferred form, the applicator and metering rolls are typically made from elastomeric materials such as synthetic rubbers.

The reverse roll coating process is illustrated in the accompanying figure. Decorative particles such as dry-blend particles and a liquid carrier material such as a plastisol are fed to mixing tank 15 via gravimetric feeders 13 and 14 respectively. The resultant composition comprising the plastisol having the decorative particles suspended therein is fed to the nip between metering roll 18 and applicator roll 19, where it forms a pool 17 or a reservoir of composition. Metering roll 18 rotates in a direction opposite the direction of applicator roll 19. The space between the metering and applicator rolls is adjusted to permit the desired amount of liquid composition to be carried by the rotating surface of applicator roll 19 to the surface of the layer 21 which is carried by conveyor roll 20 which rotates in a direction opposite that of the applicator roll 19.

Inasmuch as the use of rolls for applying various types of films or coatings to surfaces of many diversified objects is a well known commercial practice, and since the improved process of the present invention utilizes the basic equipment involved in such practices, such auxiliary features as supporting means for the rolls, as well as for chains, belt drive means, and pressure adjusting means for the rolls have been omitted from the drawing.

Although it is expected that the present invention will be used widely in the manufacture of multi-layered sheeting which is designed especially for use as floor coverings, it should be understood that the invention can be used also to manufacture other types of multi-layered sheeting prepared from compositions of the type that are particularly useful for a variety of different kinds of products, such as, for example, wall and ceiling coverings, and table, desk, and counter top surfaces. The example below is illustrative of the present invention.

EXAMPLE

This example shows the preparation of a multi-layered floor covering comprising a carrier substrate having adhered to one side thereof an embossed foamed resinous layer which in turn is covered with and has adhered thereto a resinous wear layer which has dispersed therein decorative particles. The composition from which the wear layer is formed is applied to the underlying foamed resinous layer according to the process of the present invention.

Eleven (11) mils (0.011") of a foamable plastisol were coated onto a carrier substrate according to prior art techniques. The carrier substrate, which was fed from a roll thereof, had a nominal thickness of 0.030" was 148" wide and comprised a felt backing.

The foamable plastisol comprised the following.

| | Amts., lbs. |
|---|---|
| Goodyear 180 × 10 dispersion grade PVC | 250 |
| Borden 432 dispersion grade PVC | 300 |
| Goodyear M70 suspension grade PVC | 300 |
| butyl benzyl phthalate plasticizer (BBP) | 277 |
| alkyl & aryl hydrocarbons | 150 |
| 2% Mildewcide in BBP | 63 |
| mineral spirits | 15 |
| azodicarbonamide blowing agent | 50 |
| calcium carbonate | 350 |
| Total Weight | 1755 |

The plastisol had a Brookfield viscosity of 2500 cps @ 0° F. (RVT Spindle #4, 20 rpm for 1 minute).

The foamable plastisol supported by the carrier substrate was gelled by heating and in due course, the 2-ply composite was wound into a roll and then conveyed to a printing station. At the printing station, the roll was unwound and a pattern was printed on the surface of the gelled foamable plastisol by means of a rotogravure press. For this purpose, there was used an embossing composition which included therein pigment and an inhibitor for deactivating the blowing agent in the gelled foamable plastisol. (As described in U.S. Pat. No. 3,292,094, assigned to the same assignee as the present invention, the inhibitor, upon coming into contact with the blowing agent, has the effect of raising the temperature at which the blowing agent "blows". Thus, when the gelled foamable plastisol is fused by heating the composite to an elevated temperature at a later stage of the manufacturing process, the selected portions of the plastisol that are printed with the embossing composition are not expanded, expansion being limited to those portions of the plastisol which are foamed as a result of the activation of the blowing agent.) The printed gelled composite was then wound and transported to a fusion line.

At the fusion line, the printed gelled composite was unwound and was coated according to the present invention utilizing a reverse roll coater. A liquid resinous composition having dispersed therein decorative particles (hereafter "the wearlayer composition") was applied to the surface of the printed gelled composite in a thickness of about 0.02" by the reverse roll coater.

The liquid resinous phase of the wearlayer composition comprised a plastisol of the following constituents.

| | Amts. lbs. |
|---|---|
| OXY 80HC dispersion grade PVC | 400 |
| OXY 1732 dispersion grade PVC | 450 |
| OXY BR501 suspension grade PVC | 150 |
| 2,2,4 trimethyl-1,3-pentanediol diisobutyrate (TXIB) | 150 |
| butyl benzyl phthalate plasticizer | 110 |
| alkyl benzyl phthalate plasticizer | 110 |
| alkyl & aryl hydrocarbons | 30 |
| barium/zinc phosphite | 30 |
| epoxy soybean oil | 50 |
| mineral spirits | 35 |
| benzophenone | 3 |
| Total Weight | 1518 |

The plastisol had a Brookfield viscosity of 650 cps @ 84° F. (RVT Spindle #4, 20 rpm for 1 minute).

The plastisol was prepared as follows. The plasticizers, along with heat stabilizers, light stabilizers, and diluents were added to a high shear Cowles® mixer. The liquids were blended together for one (1) minute. The dispersion grade resins were then added to the plasticizer/stabilizer blend and thereafter the suspension grade resin was added. The plastisol was then mixed for seven (7) minutes to insure proper dispersion of the resins. The temperature and viscosity of the plastisol were measured as a check for proper dispersion. The plastisol was then degassed to remove air that was induced from the mixing process and thereafter pumped to a holding tank.

The decorative particles that were used in the wear layer composition comprised a mixture of three different colored particles. The three compositions from which the different colored particles were made are as follows.

| | AMOUNTS, pounds | | |
|---|---|---|---|
| | White particles | Beige particles | Gray Particles |
| Vygen 310 PVC | 200 | 200 | 200 |
| butyl benzyl phthalate | 86 | 86 | 86 |
| 2,2,4 trimethyl-1,3-pentanediol diisobutyrate | 9.3 | 9.3 | 9.3 |
| epoxized soybean oil | 17.6 | 17.6 | 17.6 |
| tin complex stabilizer | 5.2 | 5.2 | 5.2 |
| benzotrizole light stabilizer | 1 | 1 | 1 |
| white pigment | 31.2 | — | 10 |
| yellow pigment | — | 0.2540 | — |
| red pigment | — | 0.0738 | — |
| black pigment | — | 0.0143 | 0.3510 |
| silica drying agent | 3 | 3 | 3 |

Each of the aforementioned compositions was prepared in the following manner. The Vygen 310 resin and pigment(s) were charged into a Welex high-speed mixer. The unit was engaged and, when the temperature reached 140° F. the plasticizer/stabilizer blend was added. Plasticizer/stabilizer blend addition time was between 110–130 seconds. The mixture of resin, pigments, and stabilizers was mixed until a temperature of 195° F. was reached (to achieve a dry blend state). The mixing was then slowed for two (2) minutes and discharged into a cooling chamber. The silica drying agent was then added (to promote free-flowing properties and reduce packing tendencies from storage) and the pigmented stabilized dry blend was cooled to a temperature of 130° F., removed from the cooling chamber and then allowed to cool to room temperature.

Thereafter each batch of the decorative particles was processed through a 40 mesh screen (420 microns) and onto an 80 mesh screen (177 microns) screen to remove overs and fines. Desired particle size range for this particular application was 188 to 419 microns.

Particles of the desired size range were then admixed in a low speed mixer, such as a Baker-Perkins sigma mixer, in the following proportions.

| Particles, Color | Percent Loading (%) | (Lbs.) |
|---|---|---|
| White | 96.1 | 600 |
| Beige | 1.3 | 8 |
| Gray | 2.6 | 16 |
| Total | 100% | 624 |

The blend of decorative particles was then stored in fiber drums and transferred to the fusion line for further processing.

A continuous mix and feed system was employed to mix the blend of decorative particles and the plastisol for the purpose of forming the wearlayer composition which in turn was fed to the reverse roll coater. For this purpose, the particles and plastisol were mixed in a conical-shaped mixing vessel which was equipped with a mixing basket and mixer. The particles and plastisol were fed respectively to the mixing vessel by use of a gravimetric feeder and variable speed liquid pump, each of which was capable of being controlled to deliver a specified mass ratio of the decorative particles to plastisol. Total mix time was about six (6) minutes. The resulting wearlayer composition, that is, the liquid plastisol having dispersed therein the decorative particles, was fed from the bottom of the mixing vessel to the reservoir of a reverse roll coater through a 3" diameter hose. The wearlayer composition comprised a 10 wt. % concentration of the decorative particles and had viscosity of 1800 cps @ 80° F. This composition was delivered from the pond of the reverse roll coater to the coater for application onto the surface of the aforedescribed printed gelled composite under the following conditions.

| | |
|---|---|
| wearlayer/decorative stock application (mils) | 20.4 |
| line speed (fpm) | 53–60 |
| composite roll speed (fpm) | 53–60 |
| applicator roll (fpm) | 90–102 |
| metering roll (fpm) | 4.4–5.1 |
| casting ratio | 1.7:1 |
| nip settings (mils) | 23.5 |

The printed gelled composite having thereon the coating of wearlayer composition was then fused at an elevated temperature to form an inlaid wearlayer and to decompose the blowing agent in the gelled composite and effect foaming thereof in those portions not printed with the embossing composition. Fusion was effected in an oven of the air-circulating type and having six (6) zones. Zone temperatures (°F.) were as follows: (1) 350; (2) 375; (3) 410; (4) 400; (5) 375; and (6) 350.

A urethane coating was then applied to the fused product, and the coating cured via U.V. exposure. The urethane coating impacted a glossy appearance to the composite. The exemplary floor covering had the following characteristics.

| | Inch |
|---|---|
| overall thickness | 0.0815 |
| urethane topcoat | 0.0015 |
| inlaid wearlayer | 0.020 |
| foam layer (2.7:1 blow ratio) | 0.030 |
| felt backing | 0.030 |
| embossing depth | 0.020 |

Examination of the resulting product showed that the monolithic layer was substantially uniform in thickness, had a particularly smooth surface, and had the decorative particles substantially, uniformally distributed therethrough. The particles did not protrude above the surface of the wearlayer. They were even with or below the surface. Observation showed that the particles in the monolithic layer were substantially of the same shape as the shape of the particles used in forming the layer.

In summary, it can be said that the present invention provides an efficient means for manufacturing an improved product comprising multi-layered sheeting.

What is claimed is:

1. In multi-layered sheeting having a predetermined width and including at least first and second layers substantially co-extensive with the width of said sheeting, said second layer being a monolithic layer containing decorative particles, the improvement comprising:

said second layer of said sheeting having a substantially uniform thickness of from about 0.015 inch to about 0.075 inch, said second layer having been formed by continuously applying to the surface of said first layer a fluid composition having a viscosity of from about 1000–15000 cps and comprising liquid material having substantially uniformly dispersed therein said decorative particles, said liquid composition having been continuously applied to the surface of said first layer in a zone extending across substantially the entire width of the surface as the sheeting is continuously moved transversely of said zone and under conditions such that: (i) the surface of said liquid composition as applied is substantially smooth; (ii) the thickness of the monolithic layer formed from said liquid composition is substantially uniform; and (iii) said decorative particles are substantially uniformly dispersed in said monolithic layer.

2. The multi-layered sheeting of claim to wherein said monolithic layer comprises from about 1% to about 25% by wt. of said decorative particles.

3. The multi-layered sheeting of claim 2 wherein said monolithic layer comprises from about 10% to about 15% by wt. of said decorative particles.

4. Sheeting according to claim 1 wherein said monolithic layer comprises resin particles dispersed in a transparent fused resin matrix.

5. Sheeting according to claim 4 wherein poly(vinyl chloride) resin particles are fused in a matrix of poly(vinyl chloride) .

6. Sheeting according to claim 5 in the form of a flooring material.

7. Flooring material according to claim 6 including a backing and adhered thereto said monolithic layer which comprises the wearlayer of said flooring material.

8. Flooring material according to claim 6 including a backing underlying and adhered to an overlying printed embossed layer, said monolithic layer overlying and adhered to said embossed layer and comprising the wearlayer of said flooring material.

9. Flooring material according to claim 8 including a finishing layer overlying and adhered to said monolithic layer and being glossy in appearance.

* * * * *

UNITED STATES PATENT AND TRADEMARK OFFICE

CERTIFICATE OF CORRECTION

PATENT NO. : 5,411,811
DATED : May 2, 1995
INVENTOR(S) : Piacente et al.

It is certified that error appears in the above-indentified patent and that said Letters Patent is hereby corrected as shown below:

Column 10, line 35, delete "0°F", and insert --80°F--.

Column 14, line 12, after "claim" delete "to" and insert --1-- therefor.

Signed and Sealed this

Twenty-fifth Day of March, 1997

Attest:

BRUCE LEHMAN

*Attesting Officer*

*Commissioner of Patents and Trademarks*